(12) United States Patent
Mosher et al.

(10) Patent No.: US 11,204,752 B1
(45) Date of Patent: Dec. 21, 2021

(54) INTELLIGENT MIGRATION OF FIRMWARE CONFIGURATION SETTINGS

(71) Applicant: American Megatrends International, LLC, Norcross, GA (US)

(72) Inventors: Bejean David Mosher, Acworth, GA (US); Senthamizhsey Subramanian, Suwanee, GA (US)

(73) Assignee: American Megatrends International, LLC, Norcross, GA (US)

( * ) Notice: Subject to any disclaimer, the term of this patent is extended or adjusted under 35 U.S.C. 154(b) by 0 days.

(21) Appl. No.: 16/438,122

(22) Filed: Jun. 11, 2019

(51) Int. Cl.
*G06F 8/65* (2018.01)
*H04L 9/06* (2006.01)
*G06F 9/445* (2018.01)

(52) U.S. Cl.
CPC ............ *G06F 8/65* (2013.01); *G06F 9/44505* (2013.01); *H04L 9/0643* (2013.01)

(58) Field of Classification Search
CPC ....... G06F 8/65; G06F 9/44505; H04L 9/0643
USPC ........................................................ 717/168
See application file for complete search history.

(56) References Cited

U.S. PATENT DOCUMENTS

| | | | | |
|---|---|---|---|---|
| 6,671,802 B1* | 12/2003 | Ott | ...................... | G06F 9/44505 713/100 |
| 2008/0126784 A1* | 5/2008 | Lima | ................... | G06F 11/2094 713/2 |
| 2008/0259844 A1* | 10/2008 | Richeson | ............. | H04M 11/002 370/328 |
| 2010/0217927 A1* | 8/2010 | Song | ..................... | G06F 3/0616 711/103 |
| 2011/0202273 A1* | 8/2011 | Nogtev | ................... | G01C 21/32 701/532 |
| 2011/0320758 A1* | 12/2011 | Craddock | ........... | G06F 12/0292 711/206 |
| 2012/0084550 A1* | 4/2012 | Mizusawa | ........... | G06F 11/1417 713/2 |
| 2017/0040057 A1* | 2/2017 | Cho | ........................ | G06F 13/16 |
| 2017/0344085 A1* | 11/2017 | Ragupathi | .............. | G06F 1/206 |
| 2018/0089189 A1* | 3/2018 | Gakhar | ............... | H04L 67/1097 |
| 2019/0394046 A1* | 12/2019 | Su | ............................. | G06F 8/65 |
| 2020/0104504 A1* | 4/2020 | Chaiken | ................ | G06F 21/572 |

* cited by examiner

*Primary Examiner* — Lewis A Bullock, Jr.
*Assistant Examiner* — Theodore E Hebert
(74) *Attorney, Agent, or Firm* — Newport IP, LLC; Leonard J. Hope

(57) ABSTRACT

A firmware settings data structure and a settings mapping table for a first firmware are stored in a non-volatile memory. A second firmware settings data structure and a second settings mapping table for a second firmware are also stored. An entry is selected in the second firmware settings mapping table. A search is made of the first settings mapping table for an entry having an identifier that is the same as an identifier in the selected entry in the second firmware settings mapping table. If a matching entry is located, a value in the first firmware settings data structure identified by the entry in the first firmware settings mapping table is copied to the second firmware settings data structure. If a matching entry is not found in the first firmware settings data structure, a default value for the firmware setting is stored in the second firmware settings data structure.

6 Claims, 9 Drawing Sheets

INTELLIGENT MIGRATION OF FIRMWARE CONFIGURATION SETTINGS

BACKGROUND

Computing system firmware commonly utilizes firmware configuration settings to determine the manner in which aspects of a computer operate. Typical firmware can utilize hundreds of configuration settings. These settings, either set by a manufacturer of the computer system or a user of the computer system, can include, but are not limited to, settings defining a boot order, firmware setup defaults, a firmware password, the date and time, hard drive settings, the amount of memory installed, central processing unit ("CPU") settings, power-on settings, and others. Firmware settings are typically stored in a data structure in a non-volatile memory along with the firmware.

As with other software, firmware may be updated from time to time. The updates may be major or minor in nature. For example, a firmware might be updated to optimize aspects of the operation of a computer or in response to a security issue, among other possibilities. In some instances, the format of the data structure utilized to store firmware configuration settings can change when a firmware is updated. For example, fields in the data structure might be moved or have their size changed. Fields might also be added to or removed from the data structure.

When the format of a data structure used to store firmware configuration settings changes as a result of a firmware update, the new firmware can read incorrect firmware configuration settings from the data structure because the stored data structure is configured for use by the previous version of the firmware. As a result, a computing system might be configured incorrectly, resulting in a malfunction. One way to address this problem is to clear the data structure used to store firmware configuration settings when a firmware is updated and store default values for the firmware configuration settings in a new data structure configured for use by the new firmware. This, however, results in a user having to recreate their desired firmware configuration settings, which can be time consuming and complex for some users.

It is with respect to these and other considerations that the disclosure made herein is presented.

SUMMARY

Technologies are described herein for intelligent migration of firmware configuration settings, which might be referred to herein as "firmware settings" or simply "settings." Through implementations of the disclosed technologies, firmware configuration settings can be intelligently migrated from one data structure (e.g. a data structure configured for use with one version of a firmware) to a different data structure (e.g. a data structure configured for use with another version of a firmware). Because the firmware settings are intelligently migrated, the possibility of an incorrect configuration due to the use of a data structure incompatible with a particular firmware version is eliminated. This also eliminates the requirement for users to recreate a firmware configuration in scenarios where firmware settings are cleared during a firmware update. Technical benefits other than those specifically mentioned herein can also be realized through implementations of the disclosed technologies.

In order to provide these technical benefits, and potentially others, a firmware settings data structure is stored in a non-volatile memory of a computing device that is configured for use by a firmware (which might be referred to herein as a "first firmware"). As discussed above, the firmware settings data structure includes fields storing firmware configuration settings. As also discussed above, these settings, either set by a manufacturer of the computer system or a user of the computer system, can include, but are not limited to, settings defining a boot order, firmware setup defaults, a firmware password, the date and time, hard drive settings, the amount of memory installed, CPU settings, power-on settings, and others. The data structure can be stored in a non-volatile memory along with the firmware itself.

A settings mapping table (which might be referred to herein as the "first settings mapping table") is also stored that is associated with the firmware. The settings mapping table includes entries that can be used to intelligently migrate the firmware settings to another firmware settings data structure, such as that associated with a newer version of the firmware. In one configuration, the settings mapping table includes entries storing offsets of the fields in the first firmware settings data structure, field sizes for the fields in the first firmware settings data structure, and unique identifiers ("IDs") for the fields in the first firmware settings data structure. The unique IDs might be, for instance, unique strings or hash values. When hash values are utilized, the hash values can be generated from unique names associated with the firmware settings. For example, the hash values can be generated from unique names associated with the firmware settings using the MD5 message-digest algorithm, which produces a 128-bit hash value. Other algorithms can be used in other embodiments.

A settings mapping table (which might be referred to herein as the "second settings mapping table") is also stored that is associated with another firmware (which might be referred to herein as the "second firmware"). This firmware can be a different version of the first firmware or another firmware altogether. In one embodiment, the second settings mapping table stores entries that define offsets of fields in a firmware settings data structure (which might be referred to herein as the "second firmware settings data structure") used by the second firmware. The second settings mapping table can also store data defining field sizes for the fields in the second firmware settings data structure and unique IDs for the fields in the second firmware settings data structure. The unique IDs can be generated in the manner described above.

In order to migrate firmware settings from the first firmware settings data structure to the second firmware settings data structure an entry is first selected in the second firmware settings mapping table. A search is then made of the first settings mapping table for an entry having a unique ID that is the same as a unique ID stored in the selected entry in the second firmware settings mapping table. If a matching entry is located in the first settings mapping table, a value from a location in the first firmware settings data structure identified by the entry in the first firmware settings mapping table is copied to a location in the second firmware settings data structure. If a matching entry is not found in the first firmware settings data structure, a default value for the firmware setting is stored in the second firmware settings data structure at a location defined by the entry in the second firmware settings mapping table.

The process described above is repeated for each entry in the second firmware settings mapping table. Once migration has completed, the second firmware settings data structure can be stored in a non-volatile memory and the settings stored therein can be used to configure the computing device.

It should be appreciated that the above-described subject matter can also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of the technologies disclosed herein in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for intelligent migration of firmware configuration settings. As discussed briefly above, implementations of the disclosed technologies can eliminate the possibility of an incorrect configuration due to the use of a data structure that is incompatible with a particular firmware version is eliminated and eliminate the requirement for users to recreate a firmware configuration in scenarios where firmware settings are cleared during a firmware update. Technical benefits other than those specifically mentioned herein can also be realized through implementations of the disclosed technologies.

It is to be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. The configurations described herein can be practiced in distributed computing environments, where tasks can be performed by remote computing devices that are linked through a communications network. In a distributed computing environment, program modules can be located in both local and remote memory storage devices.

In the following detailed description, references are made to the accompanying drawings that form a part hereof, and that show, by way of illustration, specific configurations or examples. The drawings provided herewith are not drawn to scale. Like numerals represent like elements throughout the several figures (which might be referred to herein as a "FIG." or "FIGS.").

Figure 1A:
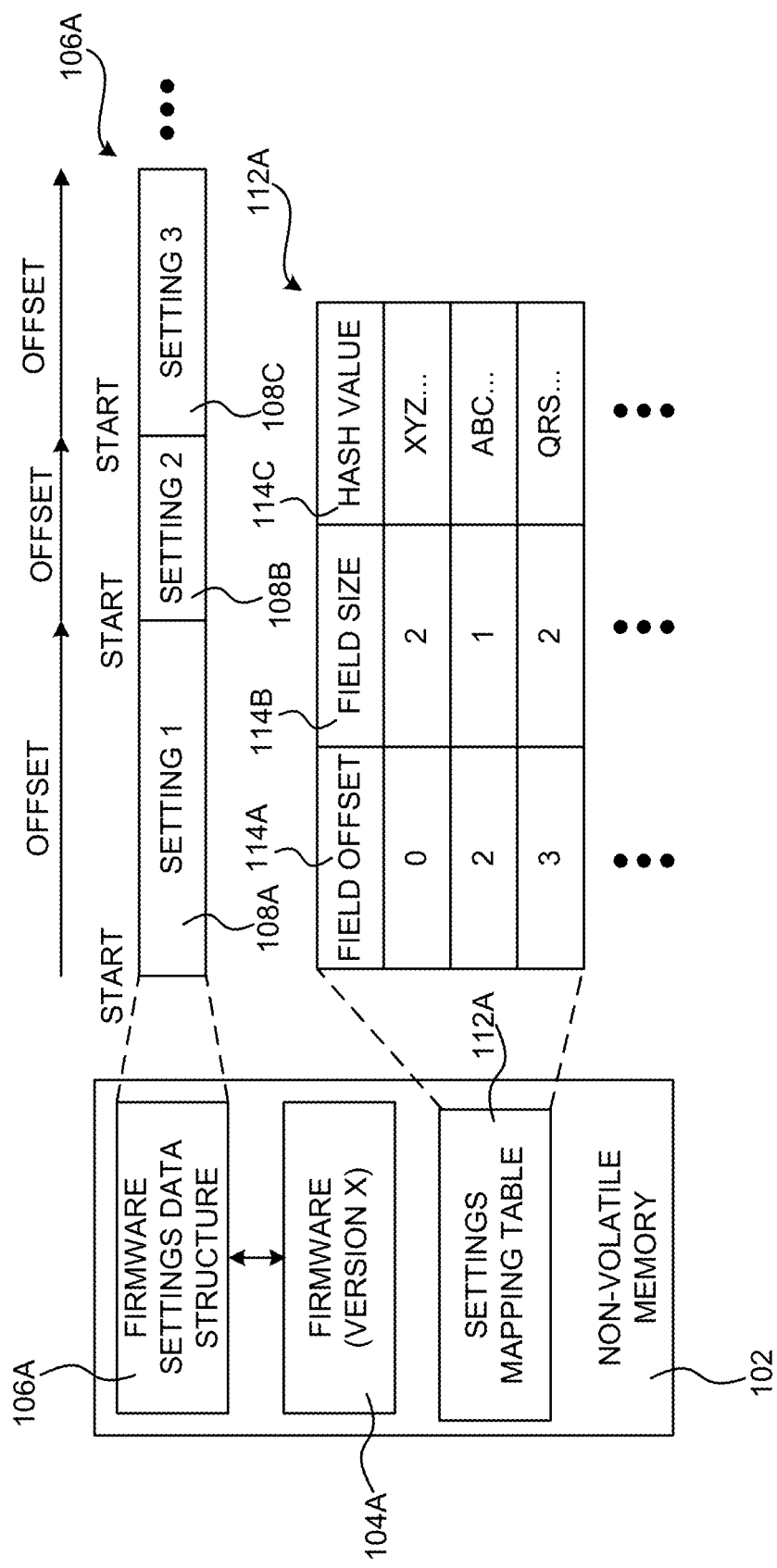
FIGS. 1A and 1B are memory and data structure diagrams showing aspects of the configuration of several illustrative firmware settings data structures and illustrative settings mapping tables utilized in embodiments disclosed herein.
Figure 1B:
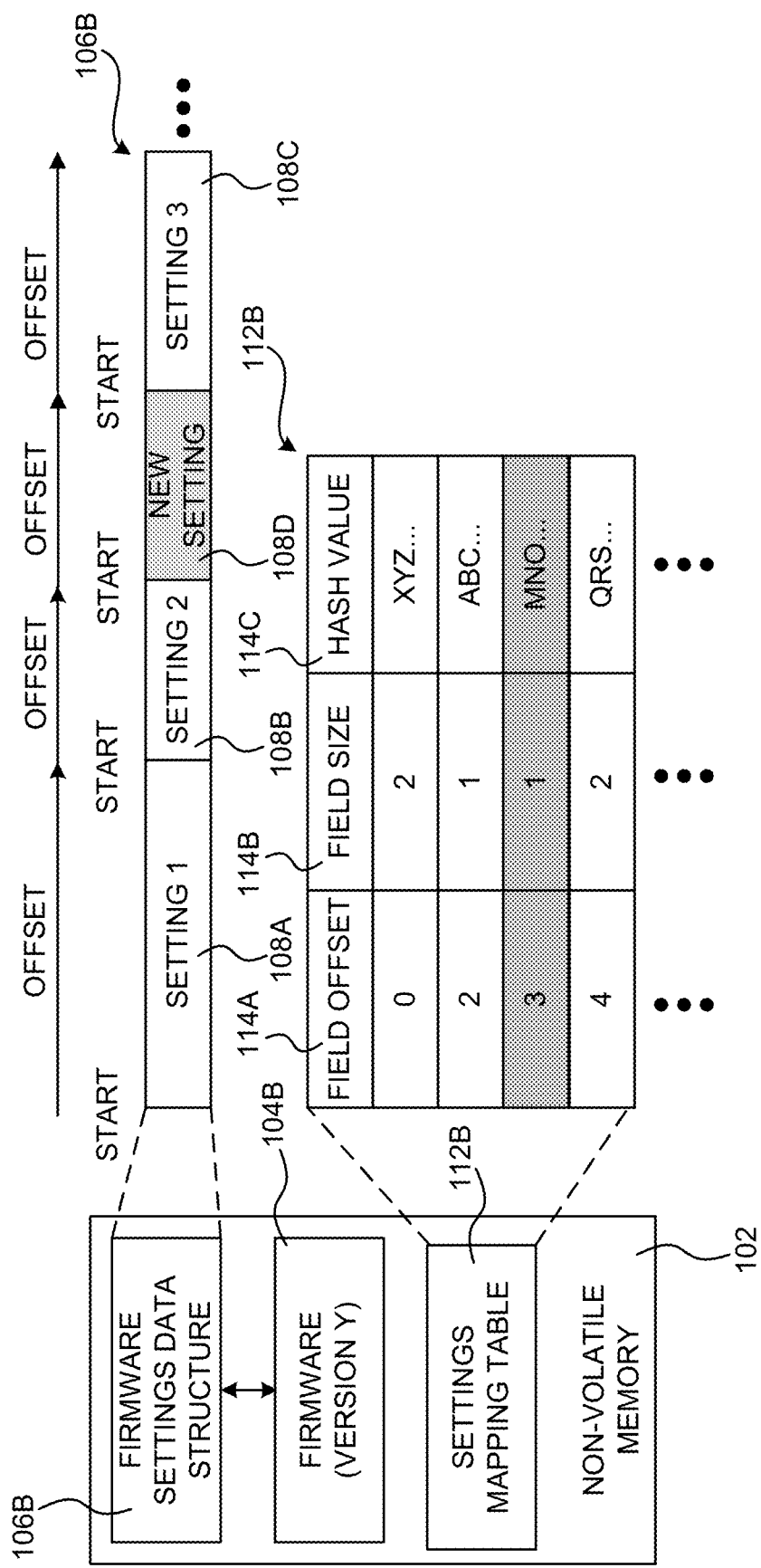

FIGS. 1A and 1B are memory and data structure diagrams showing aspects of the configuration of several illustrative firmware settings data structures and illustrative settings mapping tables utilized in embodiments disclosed herein. In particular, FIG. 1A shows a non-volatile memory 102 storing a firmware 104A (which might be referred to herein as the "first firmware 104A"). FIG. 1B shows another firmware 104B (which might be referred to herein as the "second firmware 104B"). The second firmware 104B can be a different version of the first firmware 104A or another firmware altogether. In the example illustrated in FIGS. 1A and 1B, the second firmware 104B is a different version (version "Y") of the first firmware 104A (version "X").

The firmware 104A and 104B shown in FIGS. 1A and 1B and described herein are compliant with the Unified Extensible Firmware Interface ("UEFI") Specification, which is described in greater detail below with regard to FIG. 4. The disclosed technologies can, however, be implemented in other types of firmware in other configurations.

As described briefly above, the firmware 104A and 104B can store, retrieve, and utilize firmware settings stored in a non-volatile memory device 102. In particular, each firmware 104A and 104B utilizes a firmware settings data structure 106A and 106B, respectively, that stored in a non-volatile memory 102. As discussed above, each firmware settings data structure 106A and 106B includes fields 108 storing firmware configuration settings. As also discussed above, these settings, either set by a manufacturer of the computer system or a user of the computer system, can include, but are not limited to, settings defining a boot order, firmware setup defaults, a firmware password, the date and time, hard drive settings, the amount of memory installed, CPU settings, power-on settings, and others.

As in the examples shown in FIGS. 1A and 1B, the firmware settings data structures 106A and 106B can be stored in the same non-volatile memory 102 as the firmware 104A and 104B, respectively. The settings defined by a firmware settings data structure 106 might be loaded by a computing system upon power-up or reboot in order to configure aspects of the operation of the computing system.

As discussed above, the format of the firmware settings data structure 106 can change when a firmware 104 is updated. For example, fields in the data structure might be moved or have their size changed. Fields might also be added to or removed from the data structure. In the example shown in FIG. 1A, for instance, the firmware settings data structure 106A includes three fields 108A-108C. Each of the fields 108A-108C can be referenced by a starting location and an offset from the starting location.

As shown in FIG. 1B, the updated version of the firmware 104A (i.e. the firmware 104B) utilizes a firmware settings data structure 106B having a different format than the firmware settings data structure 106A. In particular, a field 108D for a storing a new configuration setting has been added to the firmware settings data structure 106B. As a result, the start and offset of the field 108C has changed as compared to the firmware settings data structure 106A.

When the format of the firmware settings data structure 106 changes as a result of a firmware update, as in the example shown in FIGS. 1A and 1B, the new firmware (i.e. the firmware 104B) can read incorrect firmware configuration settings because the stored data structure is configured for use by the previous version of the firmware 104A. For instance, if the firmware 104B reads from the firmware settings data structure 106A following an upgrade, incorrect settings will be applied. The new firmware may expect settings to follow the format of 106B and read setting three from the offset indicated by 108C, yet it will actually be stored at the offset indicated by 108D. As a result, a computing system might be configured incorrectly, resulting in a malfunction or other problems. The technologies disclosed herein address these and other technical considerations.

In order to address the technical problems described above, and potentially others, a settings mapping table 112A (which might be referred to herein as the "first settings mapping table 112A") is also stored in the non-volatile memory 102 that is associated with the firmware 104A. The settings mapping table 112A includes entries that can be used to migrate the firmware settings in the firmware settings data structure 106A to another firmware settings data structure 106B, such as that associated with a newer version of a firmware 104B.

In one configuration, the settings mapping table 112A includes an entry 114A storing offsets of the fields 108 in the first firmware settings data structure 106A, an entry 114B storing field sizes for the fields 108 in the first firmware settings data structure 104A, and an entry 114C storing unique identifiers ("IDs") for the fields 108 in the first firmware settings data structure 104A. The unique IDs might be, for instance, unique strings or hash values. When hash values are utilized, the hash values can be generated from unique names associated with the firmware settings stored in the firmware settings data structure 106A. For example, the hash values can be generated from unique names associated with the firmware settings using the MD5 message-digest algorithm, which produces a 128-bit hash value. Other algorithms can be used in other embodiments.

A settings mapping table 112B (which might be referred to herein as the "second settings mapping table 112B") is also stored that is associated with the second firmware 104B. The second settings mapping table 112B stores entries 114A that define offsets of fields in the firmware settings data structure 106B used by the second firmware 104B. The second settings mapping table 112B can also store an entry 114B defining field sizes for the fields in the second firmware settings data structure 106B and unique IDs for the fields in the second firmware settings data structure 106B. The unique IDs can be generated in the manner described above.

Referring now to FIGS. 2A-2D, details will be provided illustrating aspects of a mechanism disclosed herein for intelligent migration of firmware configuration settings, according to one embodiment disclosed herein. In particular, FIGS. 2A-2D illustrate aspects of the mechanism disclosed herein for migrating firmware configuration settings with respect to two different firmware versions 104A and 104B. As discussed above, a firmware settings mapping table 112A is associated with the firmware 104A and a firmware setting mapping table 112B is associated with a firmware 104B.

As described in greater detail below, the firmware settings mapping tables 112A and 112B are utilized to migrate firmware settings from a firmware settings data structure 106A associated with the firmware 104A to a firmware settings data structure 106B associated with the firmware 104B. As also mentioned above, the firmware 104B might be a different version (e.g. a newer version) of the firmware 104A or another type of firmware altogether.

In order to migrate firmware settings from the first firmware settings data structure 106A to the second firmware settings data structure 106B, an entry is first selected in the second firmware settings mapping table 104B. In the example shown in FIG. 2A, the first entry (i.e. the entry with an offset of zero) in the second firmware settings mapping table 104B.

A search is then made of the first settings mapping table 112A for an entry having a unique ID that is the same as a unique ID stored in the selected entry in the second firmware settings mapping table 112B. If a matching entry is located in the first settings mapping table 112A, a value from a location in the first firmware settings data structure 106A identified by the entry in the first firmware settings mapping table 112A is copied to a location in the second firmware settings data structure 106B. If a matching entry is not found in the first firmware settings data structure 106A, a default value for the firmware setting is stored in the second firmware settings data structure 106B at a location defined by the entry in the second firmware settings mapping table 112B.

Figure 2A:
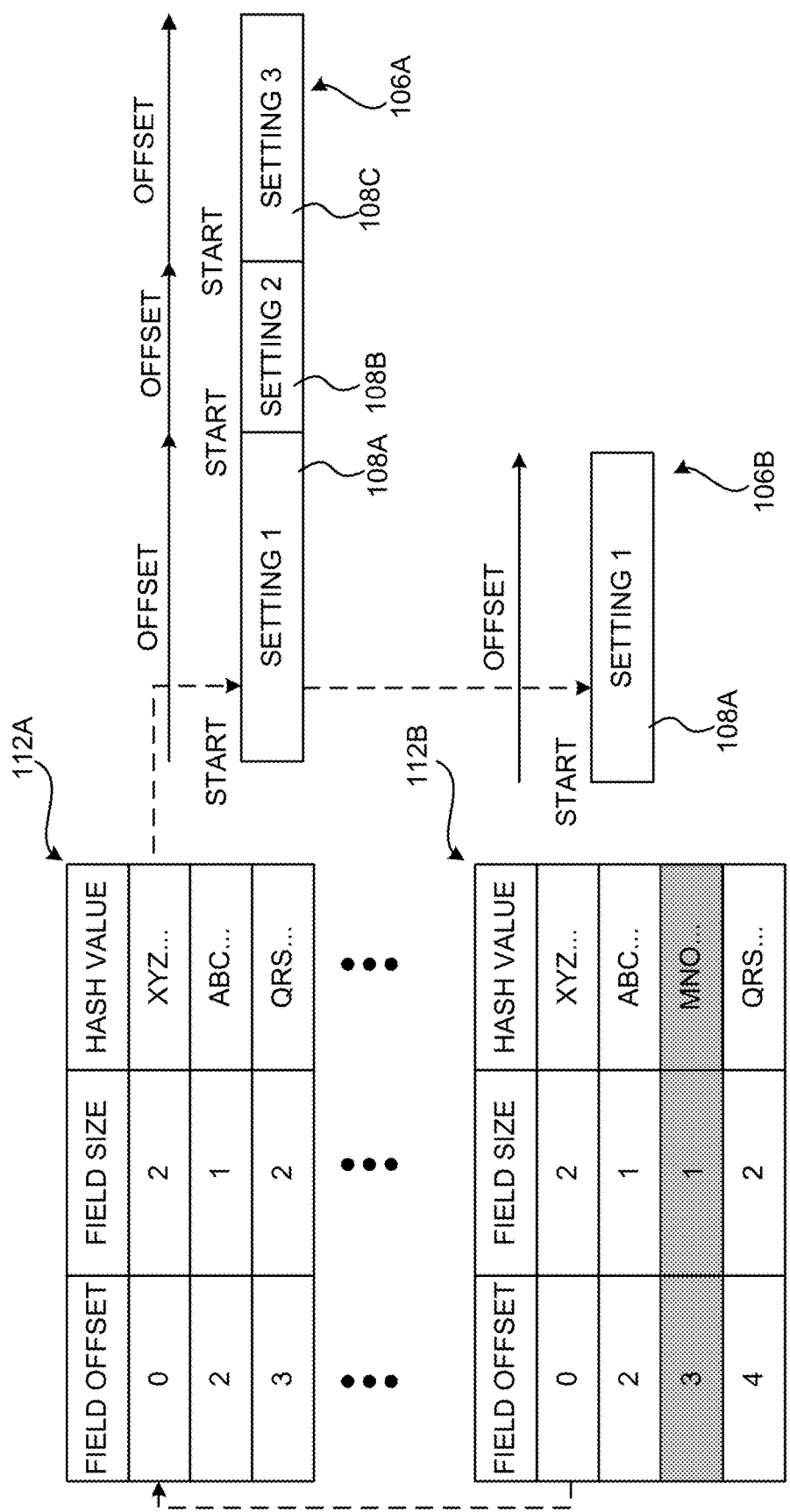
FIGS. 2A-2D are data structure diagrams illustrating aspects of a mechanism disclosed herein for intelligent migration of firmware configuration settings, according to one embodiment disclosed herein.
Figure 2B:
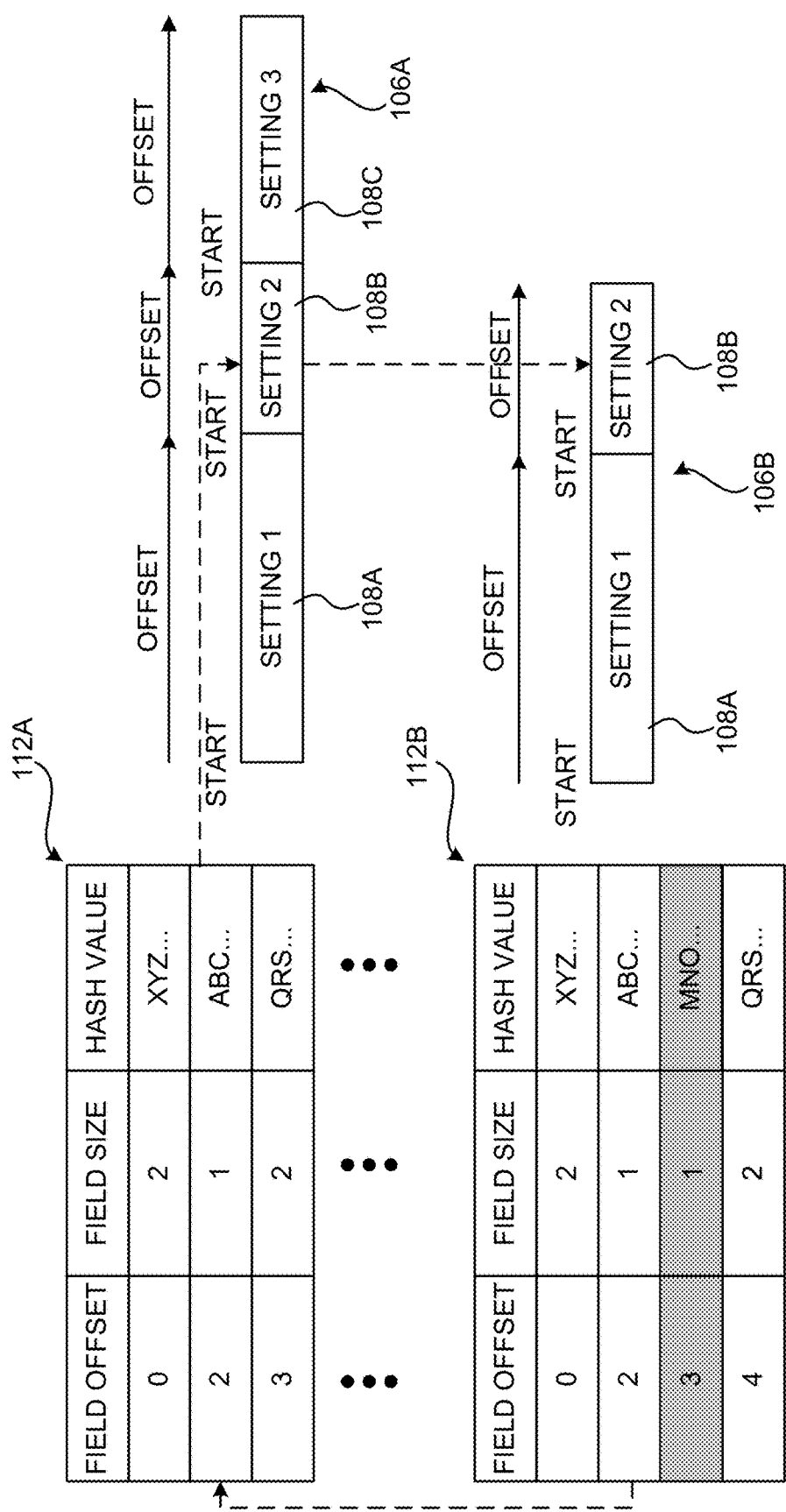

In the example shown in FIG. 2A, for instance, a match has been found between the IDs (i.e. the hash values "XYZ . . . ") in the first entries in the first settings mapping table 112A and the second settings mapping table 112B. Accordingly, the setting stored in the field 108A is copied from the first firmware settings data structure 106A to a corresponding field 108A in the second firmware settings data structure 106B.

The process described above is then repeated for each entry in the second firmware settings mapping table 112B. In the example shown in FIG. 2B, for instance, the next entry (i.e. the entry having an offset of two) in the second firmware settings mapping table 112B is selected. A search is then made of the first firmware settings mapping table 112B for the unique ID stored in the selected entry, in this case the ID "ABC . . . "

In the illustrated example, the unique ID is located in the second entry of the first firmware settings mapping table 112A. Accordingly, a setting is copied from the corresponding field 108B in the first firmware settings data structure 106A to a corresponding entry in the second firmware settings data structure 106B.

Figure 2C:
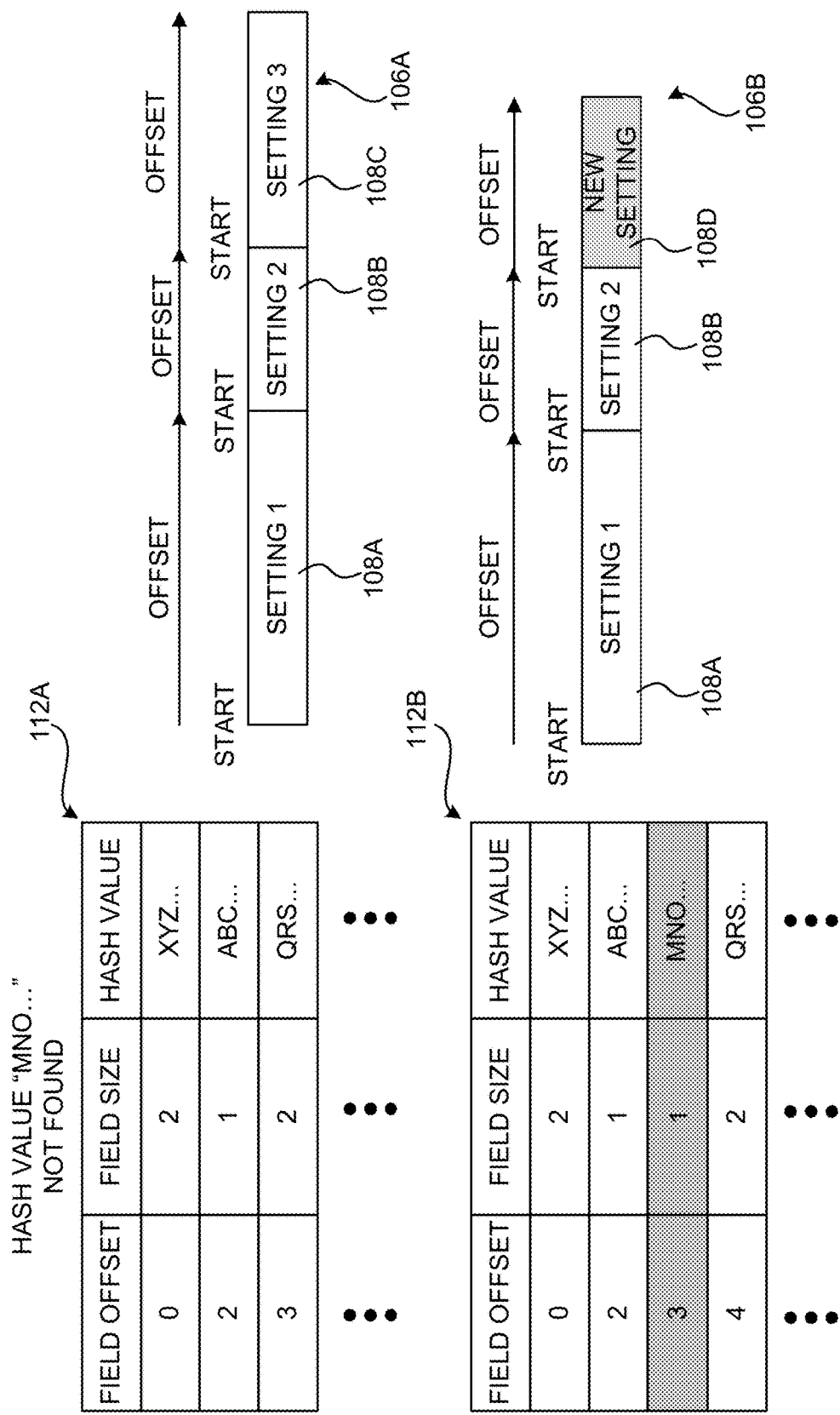

Continuing this example with regard to FIG. 2C, the next entry (i.e. the entry with an offset of three) in the firmware settings mapping table 112B is selected. A search is then made of the first firmware settings data structure 112A for the unique ID stored in the selected entry, in this case the ID "MNO . . . " In this example, the unique ID is not found in the first firmware settings mapping table 112A. Accordingly, a new entry having a default value is created in a new field 108D in the firmware settings data structure 106B.

Figure 2D:
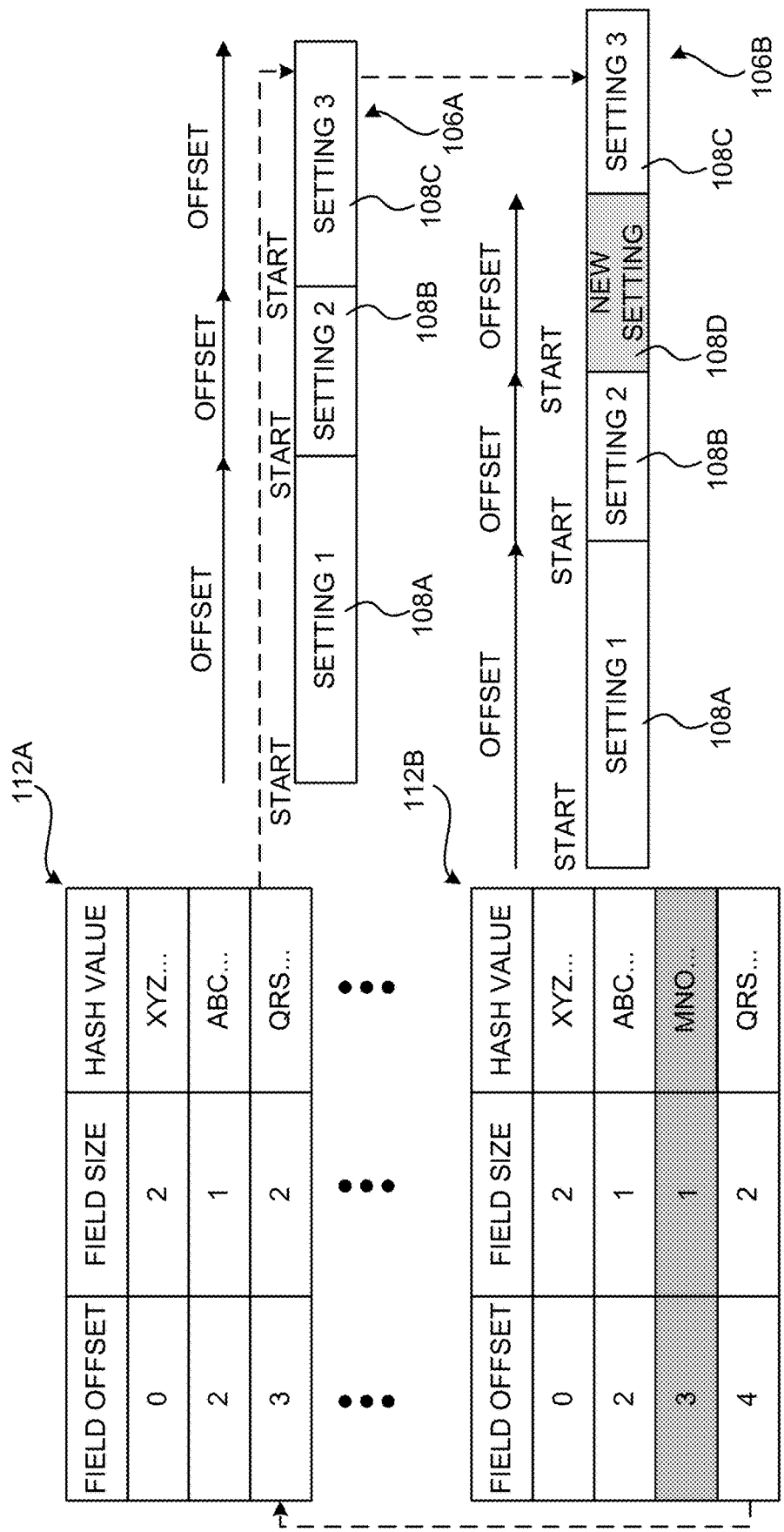

Continuing this example with regard to FIG. 2D, the next entry (i.e. the entry having an offset of four) in the second firmware settings mapping table 112B is selected. A search is then made of the first firmware settings mapping table 112B for the unique ID stored in the selected entry, in this case the ID "QRS . . . "

In the illustrated example, the unique ID is located in the fourth entry of the first firmware settings mapping table 112A. Accordingly, a setting is copied from the corresponding field 108C in the first firmware settings data structure 106A to a corresponding field 108C in the second firmware settings data structure 106B. This process continues until all of the entries in the second firmware settings mapping table 112B have been processed in the manner described above.

Figure 3:
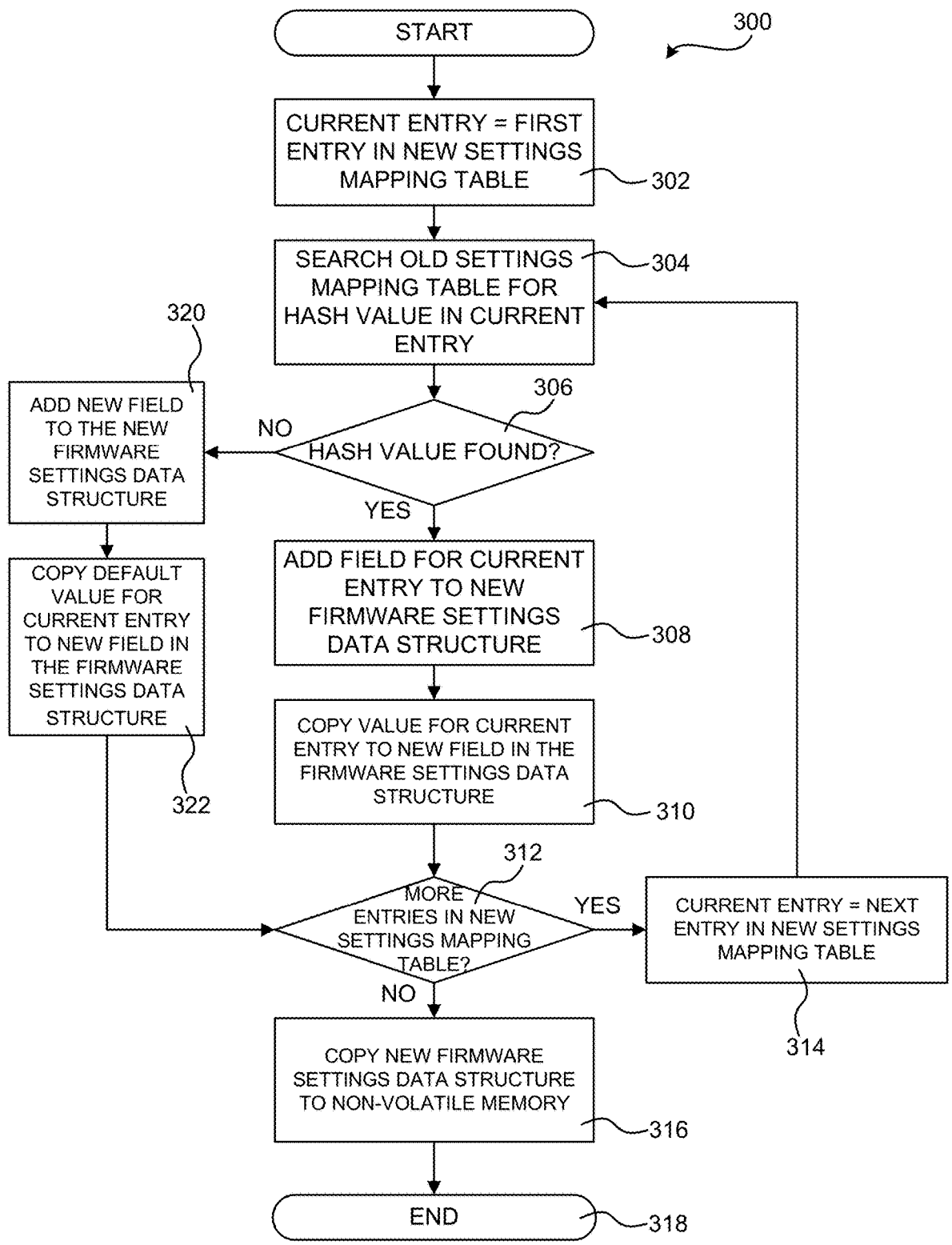
FIG. 3 is a flow diagram showing a routine that illustrate aspects of the operation of a computing device firmware for intelligent migration of firmware settings, according to one embodiment presented herein.

FIG. 3 is a flow diagram showing a routine 300 that illustrate aspects of the operation of a computing device firmware 104 for intelligent migration of firmware settings, according to one embodiment presented herein. It is to be appreciated that the logical operations described herein with respect to FIG. 3 and the other FIGS., can be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. and described herein. These operations can also be performed in parallel, or in a different order than those described herein. These operations can also be performed by components other than those specifically identified.

The routine 300 begins at operation 302, where a temporary variable for keeping track of the current entry in the firmware settings mapping table 112B is initialized to identify the first entry in the firmware settings mapping table 112B. From operation 302, the routine 300 proceeds to operation 304, where a search is made of the firmware settings mapping table 112A for the unique ID (i.e. a hash value in this example) in the current entry in the firmware settings mapping table 112B. The routine 300 then proceeds from operation 304 to operation 306.

At operation 306, a determination is made as to whether the unique ID was found at operation 304. If so, the routine 300 proceeds from operation 306 to operation 308, where a field 108 is added to the second firmware settings data structure 106B for the current entry. The routine 300 then proceeds from operation 308 to operation 310, where the value for a setting is copied from the entry in the first firmware settings data structure 106A to the new field in the second firmware settings data structure 106B.

If, at operation 306, a unique ID was not located in the first firmware settings mapping table 112A, the routine 300 proceeds from operation 306 to operation 320. At operation 320, a new field 108 is added to the second firmware settings data structure 106B. The routine 300 then proceeds from operation 320 to operation 322, where a default value for the corresponding setting is copied to the new field 108.

From operations 310 and 322, the routine 300 proceeds to operation 312, where a determination is made as to whether additional entries exist in the second firmware settings mapping table 112B to be processed. If so, the routine 300 proceeds from operation 312 to operation 314, where the variable utilized to keep track of the current entry is incremented to identify the next entry in the second firmware settings mapping table 112B. The routine 300 then proceeds from operation 314 back to operation 304, where the next entry in the second firmware settings mapping table 112B is processed in the manner described above.

If no additional entries remain to be processed, the routine 300 proceeds from operation 312 to operation 316, where the second firmware settings data structure 106B is copied to non-volatile memory 102 for use by the second firmware 104B in configuring a computing system. The routine 300 then proceeds from operation 316 to operation 318, where it ends.

Figure 4:
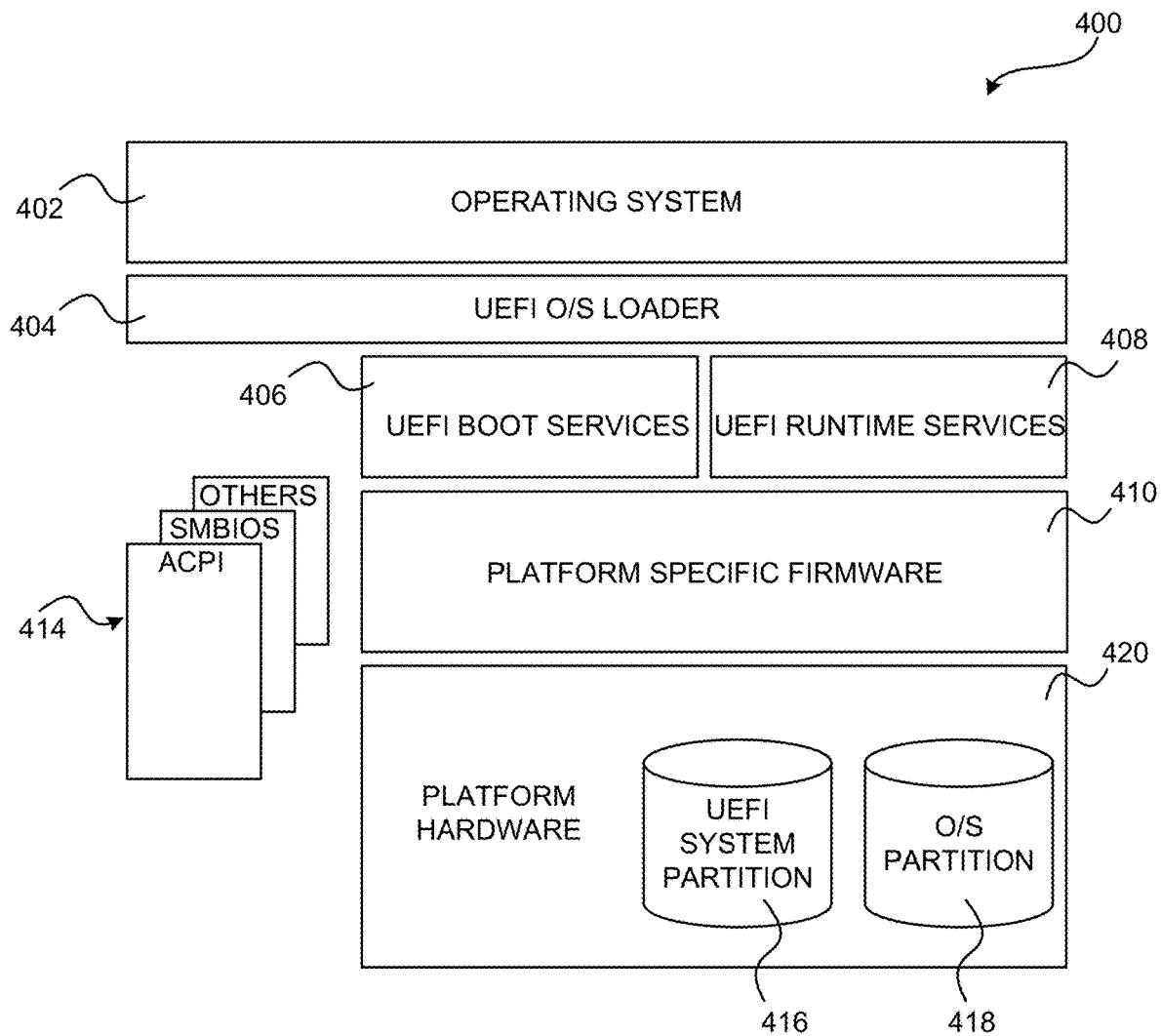
FIG. 4 is a software architecture diagram illustrating a software architecture for a UEFI-compliant firmware that provides an operating environment for aspects of the technologies presented herein in one embodiment.

Turning now to FIG. 4, a software architecture diagram will be described that illustrates an architecture 400 for a UEFI Specification-compliant firmware that can be configured to provide and/or utilize aspects of the technologies disclosed herein. In particular, the firmware architecture 400 shown in FIG. 4 can be utilized to implement the firmware 104 described above. The firmware 104 can also be implemented in other ways in other configurations.

The UEFI Specification describes an interface between an operating system 402 and a UEFI Specification-compliant firmware 104. The UEFI Specification also defines an interface that a firmware 104 can implement, and an interface that an operating system ("OS") 402 can use while booting. How a firmware implements the interface can be left up to the manufacturer of the firmware. The UEFI Specification also defines a way for an operating system 402 and a firmware 104 to exchange information necessary to support the operating system boot process. The term "UEFI Specification" used herein refers to the EFI Specification developed by INTEL CORPORATION, the UEFI Specification managed by the UEFI FORUM, and other related specifications available from the UEFI FORUM.

As shown in FIG. 4, the architecture can include platform hardware 420, such as that described below with regard to FIG. 5, an operating system 402, and a UEFI system partition 416. The UEFI system partition 416 can be an architecturally shareable system partition. As such, the UEFI system partition 416 can define a partition and file system designed to support safe sharing of mass storage between multiple vendors. An OS partition 418 can also be utilized.

Once started, the UEFI OS loader 404 can continue to boot the complete operating system 402. In doing so, the UEFI OS loader 404 can use UEFI boot services 406, UEFI runtime services 408, and an interface to other supported specifications, to survey, comprehend, and initialize the various platform components and the operating system software that manages them. Thus, interfaces 414 from other specifications can also be present on the system. For example, the Advanced Configuration and Power Management Interface ("ACPI") and the System Management BIOS ("SMBIOS") specifications can be supported.

UEFI boot services 406 can provide interfaces for devices and system functionality used during boot time. UEFI runtime services 408 can also be available to the UEFI OS loader 404 during the boot phase and can provide interfaces, such as the variable storage and retrieval services described above. UEFI allows extension of platform firmware by loading UEFI driver and UEFI application images which, when loaded, have access to UEFI-defined runtime and boot services such as those described above.

Additional details regarding the operation and architecture of a UEFI Specification-compliant firmware can be found in the UEFI Specification, which is available from the UEFI Forum. The UEFI Forum has also provided further details regarding recommended implementation of UEFI in the form of the Platform Initialization ("PI") Specification. Unlike the UEFI Specification, which focuses on programmatic interfaces for the interactions between the operating system 402 and system firmware 104, the PI specification describes a firmware implementation that has been designed to perform the full range of operations that are required to initialize a platform from power on through transfer of control to the operating system 402. The PI specification, which is available from UEFI Forum, is also expressly incorporated herein by reference.

Figure 5:
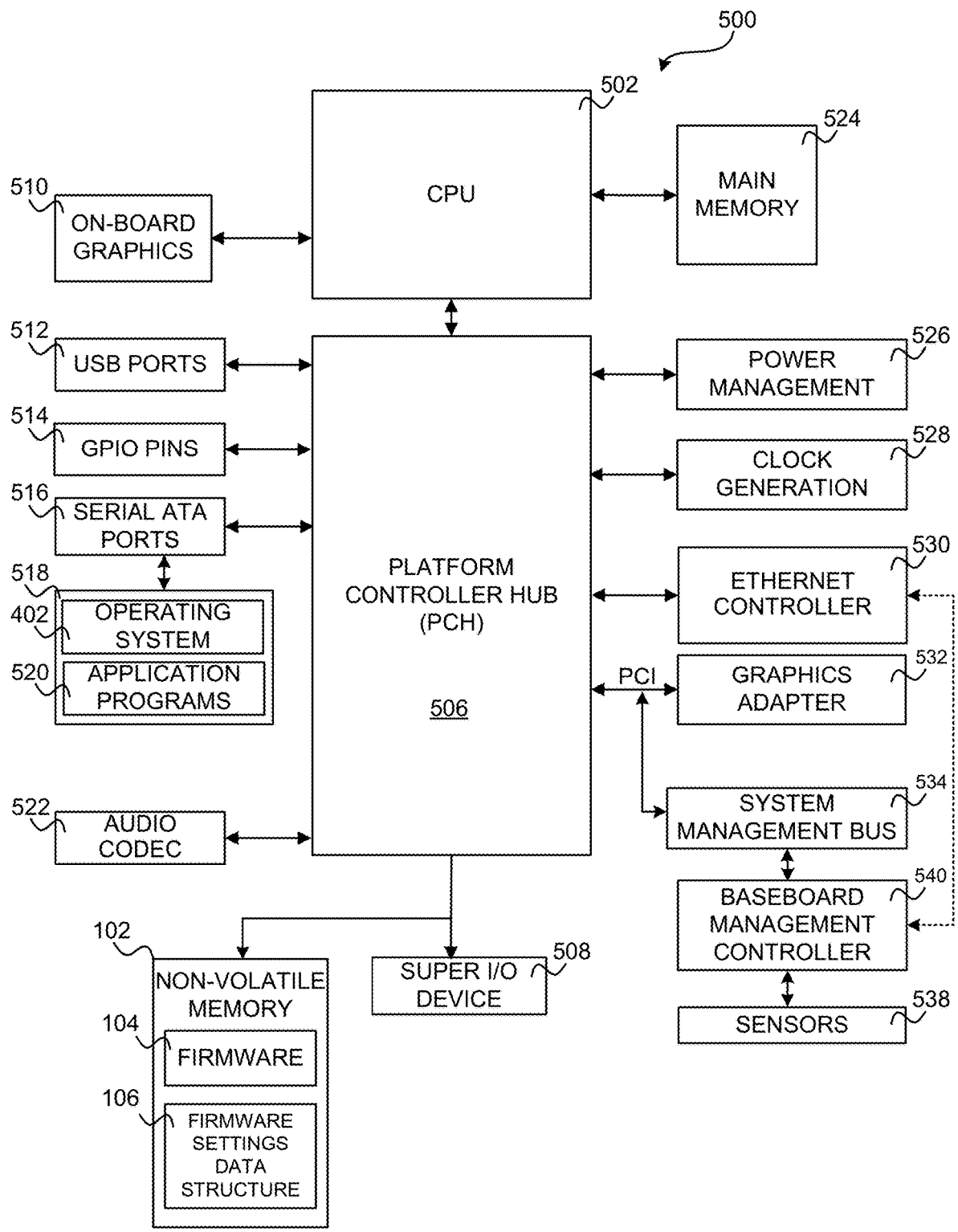
FIG. 5 is a computer architecture diagram that shows an illustrative architecture for a computer that can implement the technologies disclosed herein.

Referring now to FIG. 5, a computer architecture diagram that shows an illustrative architecture for a computer that can provide an operating environment for the technologies presented herein will be described. For example, and without limitation, the computer architecture shown in FIG. 5 can be utilized to implement a computing system that executes the firmware 104.

FIG. 5 and the following discussion are intended to provide a brief, general description of a suitable computing environment in which the configurations described herein can be implemented. While the technical details are presented herein in the general context of program modules that execute in conjunction with the execution of an operating system, those skilled in the art will recognize that the configurations can also be implemented in combination with other program modules.

Generally, program modules include routines, programs, components, data structures, and other types of structures that perform particular tasks or implement particular abstract data types. Moreover, those skilled in the art will appreciate that the configurations described herein can be practiced with other computer system configurations, including handheld devices, multiprocessor systems, microprocessor-based or programmable consumer electronics, minicomputers, mainframe computers, and the like. The configurations described herein can also be practiced in distributed computing environments where tasks are performed by remote processing devices that are linked through a communications network. In a distributed computing environment, program modules can be located in both local and remote memory storage devices.

In particular, FIG. 5 shows an illustrative computer architecture for a computer 500 that can implement the technologies described herein. The illustrative computer architecture shown in FIG. 5 includes a baseboard, or "motherboard", which is a printed circuit board to which a multitude of components or devices can be connected by way of a system bus or other electrical communication path. In one illustrative configuration, a central processing unit ("CPU") 502 operates in conjunction with a Platform Controller Hub ("PCH") 506. The CPU 502 is a central processor that performs arithmetic and logical operations necessary for the operation of the computer 500. The computer 500 can include a multitude of CPUs 502. Each CPU 502 might include multiple processing cores.

The CPU 502 provides an interface to a RAM used as the main memory 524 in the computer 500 and, possibly, to an on-board graphics adapter 510. The PCH 506 provides an interface between the CPU 502 and the remainder of the computer 500.

The PCH 506 can also be responsible for controlling many of the input/output functions of the computer 500. In particular, the PCH 506 can provide one or more universal serial bus ("USB") ports 512, an audio codec 522, an Ethernet Controller 530, and one or more general purpose input/output ("GPIO") pins 514. The USB ports 512 can include USB 2.0 ports, USB 3.0 ports and USB 3.1 ports among other USB ports.

The PCH 506 can also include functionality for providing networking functionality through an Ethernet Controller 530. The Ethernet Controller 530 is capable of connecting the computer 500 to another computer via a network. Connections which can be made by the Ethernet Controller 530 can include LAN or WAN connections. LAN and WAN networking environments are commonplace in offices, enterprise-wide computer networks, intranets, and the Internet.

The PCH 506 can also provide a bus for interfacing peripheral card devices such as a graphics adapter 532. In one configuration, the bus comprises a PCI bus. The PCI bus can include a Peripheral Component Interconnect ("PCI") bus, a Peripheral Component Interconnect eXtended ("PCI-X") bus and a Peripheral Component Interconnect Express ("PCIe") bus among others.

The PCH 506 can also provide a system management bus 534 for use in managing the various components of the computer 500. Additional details regarding the operation of the system management bus 534 and its connected components are provided below. Power management circuitry 526 and clock generation circuitry 528 can also be utilized during the operation of the PCH 506.

The PCH 506 is also configured to provide one or more interfaces for connecting mass storage devices to the computer 500. For instance, according to one configuration, the PCH 506 includes a serial advanced technology attachment ("SATA") adapter for providing one or more serial ATA ports 516. The serial ATA ports 516 can be connected to one or more mass storage devices storing an OS, such as OS 402 and application programs 520, such as a SATA disk drive 518. As known to those skilled in the art, an OS 402 comprises a set of programs that control operations of a computer and allocation of resources. An application program is software that runs on top of the operating system 402, or other runtime environment, and uses computer resources to perform application specific tasks desired by the user.

According to one configuration, the OS 402 comprises the LINUX operating system. According to another configuration, the OS 402 comprises the WINDOWS operating system from MICROSOFT CORPORATION. According to another configuration, the OS 402 comprises the UNIX operating system or one of its variants. It should be appreciated that other operating systems can also be utilized.

The mass storage devices connected to the PCH 506, and their associated computer-readable storage media, provide non-volatile storage for the computer 500. Although the description of computer-readable storage media contained herein refers to a mass storage device, such as a hard disk or CD-ROM drive, it should be appreciated by those skilled in the art that computer-readable storage media can be any available media that can be accessed by the computer 500.

By way of example, and not limitation, computer-readable storage media can comprise computer storage media and communication media. Computer storage media includes volatile and non-volatile, removable and non-removable media implemented in any method or technology for storage of information such as computer-readable instructions, data structures, program modules or other data.

However, computer-readable storage media does not encompass transitory signals. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information, and which can be accessed by the computer 500.

A low pin count ("LPC") interface can also be provided by the PCH 506 for connecting a Super I/O device 508. The Super I/O device 508 is responsible for providing a number of input/output ports, including a keyboard port, a mouse port, a serial interface, a parallel port, and other types of input/output ports. The LPC interface can also connect a computer storage media such as a ROM or a flash memory such as a non-volatile memory 102 for storing firmware 104 that includes program code containing the basic routines that help to start up the computer 500 and to transfer information between elements within the computer 500 as discussed above. As shown in FIG. 5, the non-volatile memory 102 can also store a firmware settings data structure 106, such as that described above.

It should be appreciated that the program modules disclosed herein, including the firmware 104, can include software instructions that, when loaded into the CPU 502 and executed, transform a general-purpose computer 500 into a special-purpose computer 500 customized to facilitate all, or part of, the operations disclosed herein. As detailed throughout this description, the program modules can provide various tools or techniques by which the computer 500 can participate within the overall systems or operating environments using the components, logic flows, and/or data structures discussed herein.

The CPU 502 can be constructed from any number of transistors or other circuit elements, which can individually or collectively assume any number of states. More specifically, the CPU 502 can operate as a state machine or finite-state machine. Such a machine can be transformed to a second machine, or a specific machine, by loading executable instructions contained within the program modules. These computer-executable instructions can transform the CPU 502 by specifying how the CPU 502 transitions between states, thereby transforming the transistors or other circuit elements constituting the CPU 502 from a first machine to a second machine, wherein the second machine can be specifically configured to perform the operations disclosed herein. The states of either machine can also be transformed by receiving input from one or more user input devices, network interfaces (such as the Gigabit Ethernet Controller 530), other peripherals, other interfaces, or one or more users or other actors. Either machine can also transform states, or various physical characteristics of various output devices such as printers, speakers, video displays, or otherwise.

Encoding the program modules can also transform the physical structure of the storage media. The specific transformation of physical structure can depend on various factors, in different implementations of this description. Examples of such factors can include but are not limited to the technology used to implement the storage media, whether the storage media are characterized as primary or secondary storage, and the like. For example, if the storage media are implemented as semiconductor-based memory, the program modules can transform the physical state of the semiconductor main memory 524 and/or non-volatile memory 102. For example, the software can transform the state of transistors, capacitors, or other discrete circuit elements constituting the semiconductor memory.

As another example, the storage media can be implemented using magnetic or optical technology such as hard drives or optical drives. In such implementations, the program modules can transform the physical state of magnetic or optical media, when the software is encoded therein. These transformations can include altering the magnetic characteristics of particular locations within given magnetic media. These transformations can also include altering the physical features or characteristics of particular locations within given optical media to change the optical characteristics of those locations. It should be appreciated that various other transformations of physical media are possible without departing from the scope and spirit of the present description.

As described above, the PCH 506 can include a system management bus 534. The system management bus 534 can include a baseboard management controller ("BMC") 540. The BMC 540 is a microcontroller that monitors operation of the computer 500. The BMC 540 monitors health-related aspects associated with the computer 500, such as, but not limited to, the temperature of one or more components of the computer 500, speed of rotational components (e.g., spindle motor, CPU fan, etc.) within the computer 500, the voltage across or applied to one or more components within the computer 500, and the available and/or used capacity of memory devices within the computer 500. To accomplish these monitoring functions, the BMC 540 is communicatively connected to one or more components by way of the system management bus 534 in some configurations.

In one configuration, these components include sensor devices 538 for measuring various operating and performance-related parameters within the computer 500. The sensor devices 538 can be either hardware or software based components configured or programmed to measure or detect one or more of the various operating and performance-related parameters.

The BMC 540 functions as the master on the system management bus 534 in most circumstances but can also function as either a master or a slave in other circumstances. Each of the various components communicatively connected to the BMC 540 by way of the system management bus 534 is addressed using a slave address. The system management bus 534 is used by the BMC 540 to request and/or receive various operating and performance-related parameters from one or more components, such as the firmware 104, which are also communicatively connected to the system management bus 534.

It should be appreciated that the functionality provided by the computer 500 can be provided by other types of computing devices, including hand-held computers, smartphones, gaming systems, set top boxes, tablet computers, embedded computer systems, personal digital assistants, and other types of computing devices known to those skilled in the art. It is also contemplated that the computer 500 might not include all the components shown in FIG. 5, can include other components that are not explicitly shown in FIG. 5, or might utilize an architecture completely different than that shown in FIG. 5.

Based on the foregoing, it should be appreciated that technologies for intelligent migration of firmware configuration settings have been disclosed herein. Although the subject matter presented herein has been described in language specific to computer structural features, methodological acts, and computer readable media, it is to be understood that the present invention is not necessarily limited to the specific features, acts, or media described herein. Rather, the specific features, acts and mediums are disclosed as example forms.

The subject matter described above is provided by way of illustration only and should not be construed as limiting. Various modifications and changes can be made to the subject matter described herein without following the example configurations and applications illustrated and described, and without departing from the true spirit and scope of the present invention.

What is claimed is:

1. A computer-implemented method, comprising:
   storing a first firmware settings data structure, the first firmware settings data structure associated with a first firmware and comprising firmware settings for a computing device;
   storing a first firmware settings mapping table associated with the first firmware, the first firmware settings mapping table comprising entries storing
      offsets of fields in the first firmware settings data structure,
      field sizes for the fields in the first firmware settings data structure, and
      hash values for the fields in the first firmware settings data structure, wherein the hash values for the fields in the first firmware settings data structure comprise hashes of names associated with the firmware settings for the computing device;
   storing a second firmware settings mapping table associated with a second firmware, the second firmware settings mapping table comprising entries storing
      offsets of fields in a second firmware settings data structure,
      field sizes for the fields in the second firmware settings data structure, and
      hash values for the fields in the second firmware settings data structure, wherein the hash values for the fields in the second firmware settings data structure comprise hashes of the names associated with the firmware settings for the computing device;
   for an entry in the second firmware settings mapping table,
      searching the first firmware settings mapping table for an entry having a hash value that is the same as a hash value stored in the entry in the second firmware settings mapping table,
      responsive to locating the hash value in an entry of the first firmware settings mapping table, copying a value from a location in the first firmware settings data structure identified by the entry in the first firmware settings mapping table to a location in the second firmware settings data structure, and
      responsive to not locating the hash value in an entry of the first firmware settings mapping table, storing a default value in the second firmware settings data structure at a location defined by the entry in the second firmware settings mapping table;
   consolidating the values of the second firmware settings data structure in a non-volatile memory of the computing device; and
   configuring the computing device using the values of the second firmware settings data structure in the non-volatile memory of the computing device.

2. The computer-implemented method of claim 1, wherein the hash values comprise MD5 hashes.

3. A non-transitory computer-readable storage medium having computer-executable instructions stored thereupon which, when executed by a computing device, cause the computing device to:
   store a first firmware settings data structure, the first firmware settings data structure associated with a first firmware and comprising firmware settings for the computing device;
   store a first firmware settings mapping table associated with the first firmware, the first firmware settings mapping table comprising entries storing
      offsets of fields in the first firmware settings data structure,
      field sizes for the fields in the first firmware settings data structure, and
      hash values for the fields in the first firmware settings data structure, wherein the hash values for the fields in the first firmware settings data structure comprise hashes of names associated with the firmware settings;
   store a second firmware settings mapping table associated with a second firmware, the second firmware settings mapping table comprising entries storing
      offsets of fields in a second firmware settings data structure,
      field sizes for the fields in the second firmware settings data structure, and
      hash values for the fields in the second firmware settings data structure, wherein the hash values for the fields in the second firmware settings data structure comprise hashes of the names associated with the firmware settings for the computing device;
   for an entry in the second firmware settings mapping table,
      search the first firmware settings mapping table for an entry having a hash value that is the same as a hash value stored in the entry in the second firmware settings mapping table,
      responsive to locating the hash value in an entry of the first firmware settings mapping table, copy a value from a location in the first firmware settings data structure identified by the entry in the first firmware settings mapping table to a location in the second firmware settings data structure, and
      responsive to not locating the hash value in an entry of the first firmware settings mapping table, store a default value in the second firmware settings data structure at a location defined by the entry in the second firmware settings mapping table;
   consolidate the values of the second firmware settings data structure in a non-volatile memory of the computing device; and
   configure the computing device using the values of the second firmware settings data structure in the non-volatile memory of the computing device.

4. The non-transitory computer-readable storage medium of claim 3, wherein the hash values comprise MD5 hashes.

5. A computing device, comprising:
   one or more processors; and
   at least one non-transitory computer-readable storage medium having computer-executable instructions stored thereupon which, when executed by the one or more processors, cause the computing device to:
   store a first firmware settings data structure, the first firmware settings data structure associated with a first firmware and comprising firmware settings for the computing device;

store a first firmware settings mapping table associated with the first firmware, the first firmware settings mapping table comprising entries storing
  offsets of fields in the first firmware settings data structure,
  field sizes for the fields in the first firmware settings data structure, and
  hash values for the fields in the first firmware settings data structure, wherein the hash values for the fields in the first firmware settings data structure comprise hashes of names associated with the firmware settings;
store a second firmware settings mapping table associated with a second firmware, the second firmware settings mapping table comprising entries storing
  offsets of fields in a second firmware settings data structure,
  field sizes for the fields in the second firmware settings data structure, and
  hash values for the fields in the second firmware settings data structure, wherein the hash values for the fields in the second firmware settings data structure comprise hashes of the names associated with the firmware settings for the computing device;
for an entry in the second firmware settings mapping table,
  search the first firmware settings mapping table for an entry having a hash value that is the same as a hash value stored in the entry in the second firmware settings mapping table,
  responsive to locating the hash value in an entry of the first firmware settings mapping table, copy a value from a location in the first firmware settings data structure identified by the entry in the first firmware settings mapping table to a location in the second firmware settings data structure, and
  responsive to not locating the hash value in an entry of the first firmware settings mapping table, store a default value in the second firmware settings data structure at a location defined by the entry in the second firmware settings mapping table;
consolidate the values of the second firmware settings data structure in a non-volatile memory of the computing device; and
configure the computing device using the values of the second firmware settings data structure in the non-volatile memory of the computing device.

6. The computing system of claim 5, wherein the hash values comprise MD5 hashes.

\* \* \* \* \*